United States Patent
Crowe

[15] 3,685,790
[45] Aug. 22, 1972

[54] VALVE ACTUATING MECHANISM
[72] Inventor: Harold W. Crowe, Muncie, Ind.
[73] Assignee: Maxon Corporation, Muncie, Ind.
[22] Filed: April 30, 1971
[21] Appl. No.: 138,977

[52] U.S. Cl. .............................251/67, 74/2, 251/69
[51] Int. Cl. ................................................F16h 5/40
[58] Field of Search ..................74/2; 251/69, 74, 67

[56] References Cited
UNITED STATES PATENTS
2,930,571   3/1960   Vogl..........................251/69

*Primary Examiner*—Henry T. Klinksiek
*Attorney*—Hume, Clement, Hume & Lee

[57] ABSTRACT

A safety valve control system including an electromagnetic clutch arranged to couple a driven valve member to drive means and to brake against valve retraction under normal operating conditions, and further arranged with a clutch control circuit to electrically dampen the movement of the valve member to an emergency position, such as closed, when an emergency condition occurs.

9 Claims, 8 Drawing Figures

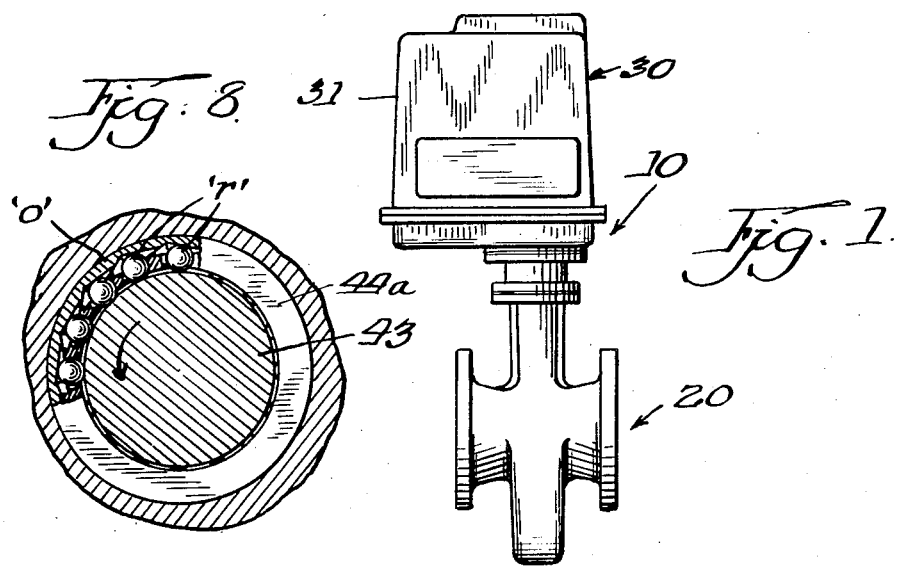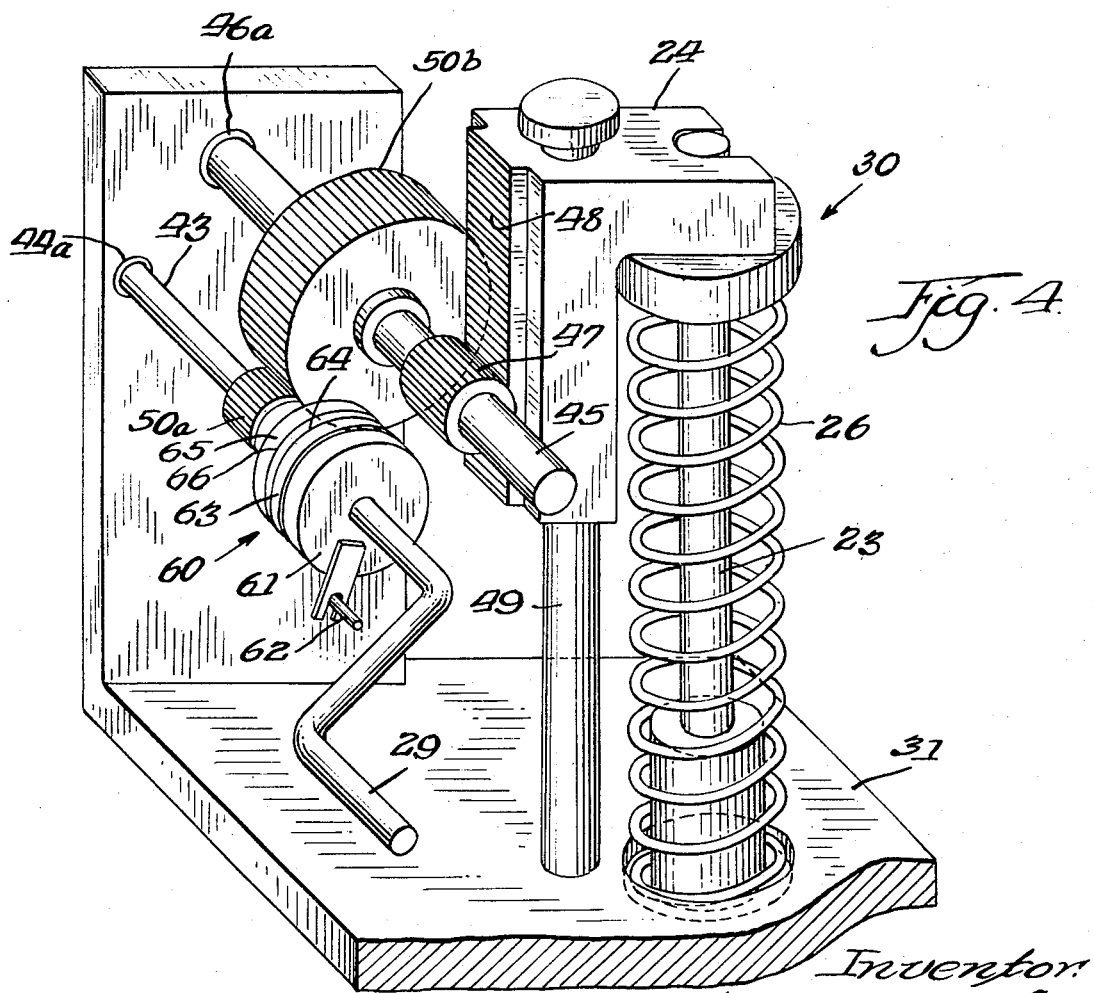

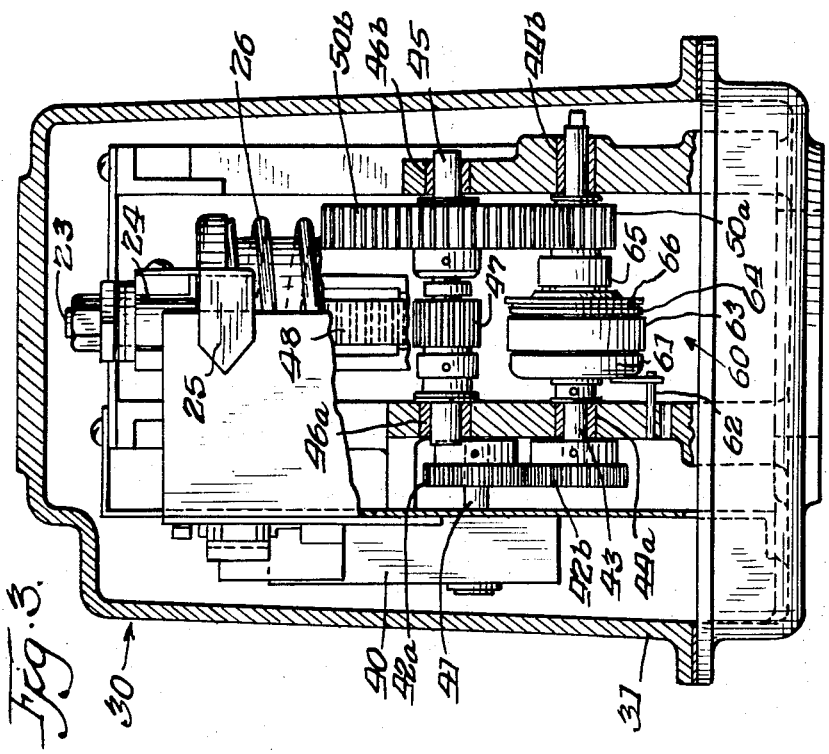
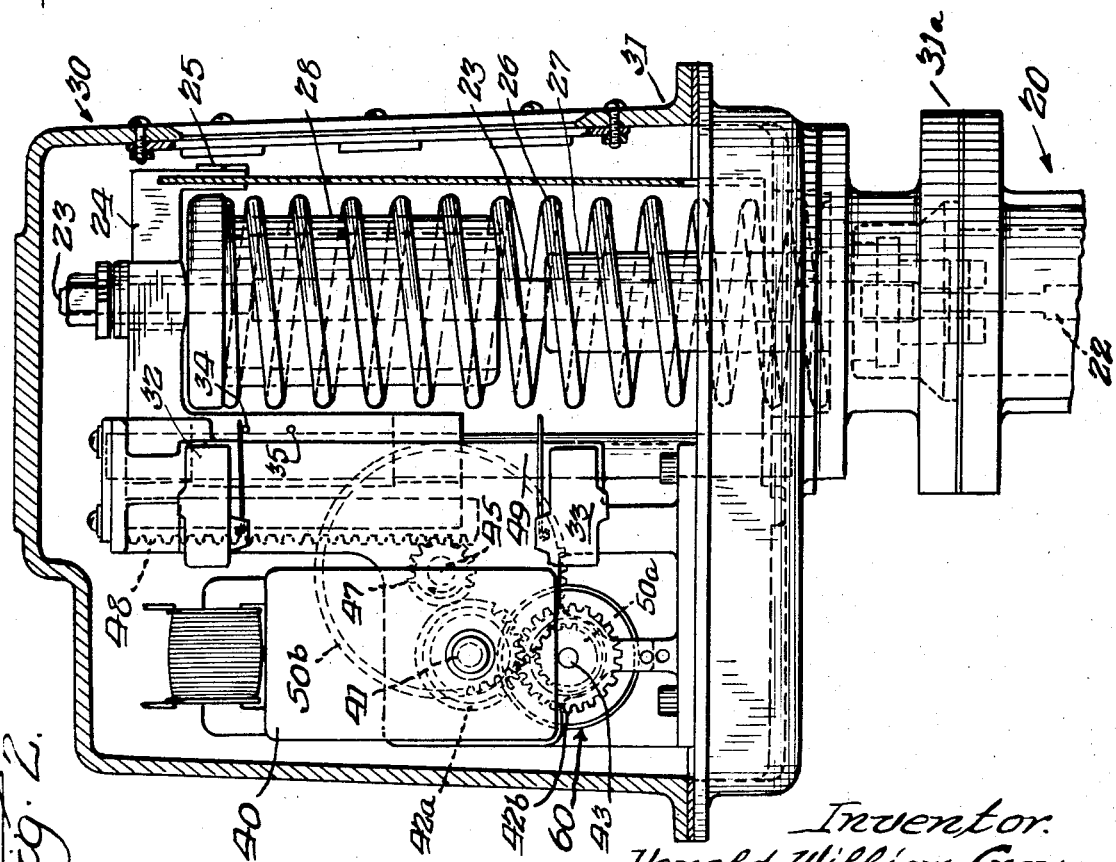

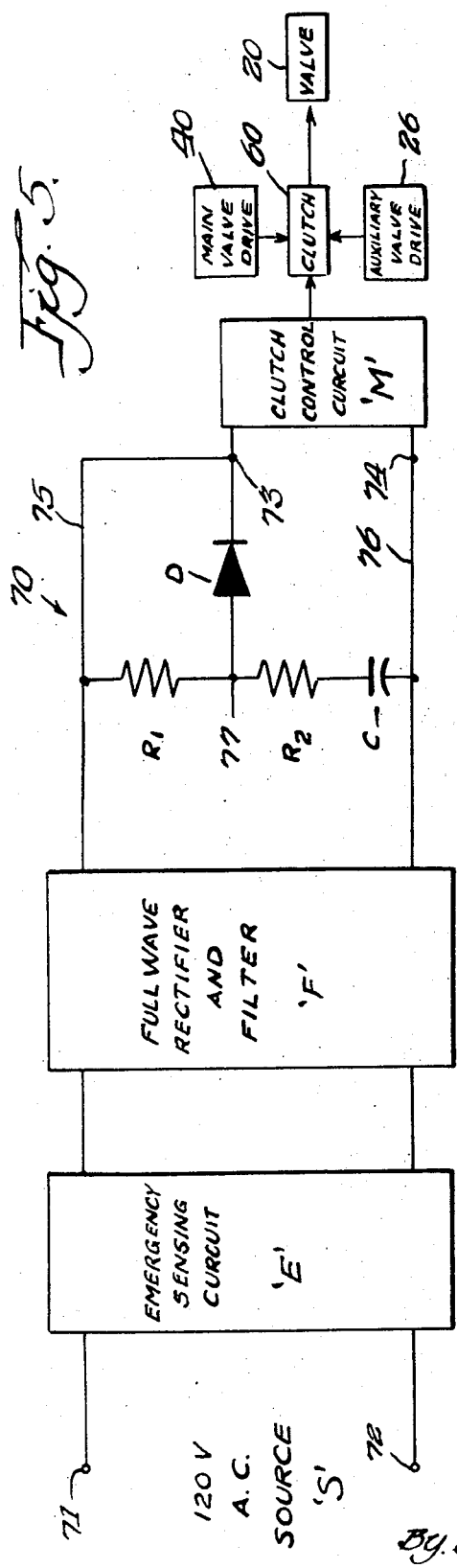
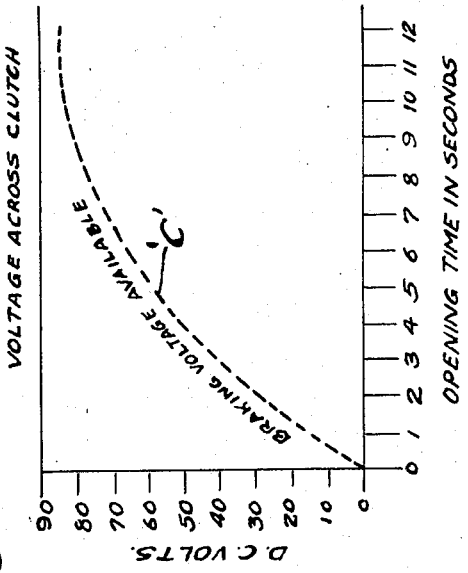
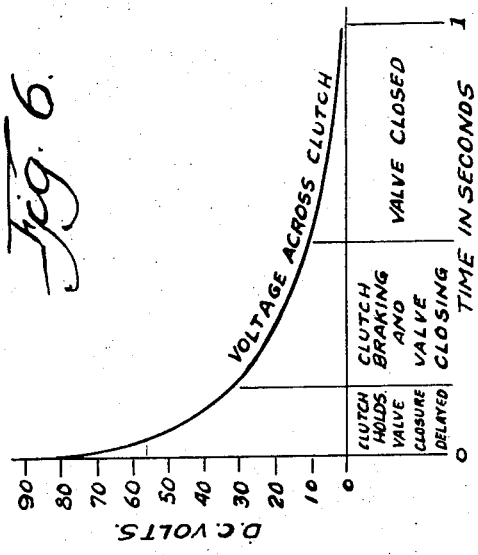

3,685,790

VALVE ACTUATING MECHANISM

BACKGROUND AND SUMMARY OF THE INVENTION

This invention relates generally to a safety valve apparatus and more particularly relates to an improved valve actuating mechanism for use in safety valve assemblies such as described and claimed in U.S. Pats. Nos. 3,082,627 and 3,508,446, assigned to the same assignee as the present invention.

Many industrial installations involving compressible or incompressible fluid systems require quick-acting control devices such as automatic shut-down equipment, for responding to emergency conditions. Industrial gas burner installations present a typical example of systems requiring such control devices. In such systems the valve actuating mechanism should be designed to permit manual or motorized control of a valve closure element so that the valve can be selectively moved between opened and closed positions when normal operating conditions prevail. Furthermore, the valve actuating mechanism should function to rapidly drive the valve into an emergency position, usually closed, in response to an emergency signal.

The actuator further must work with substantially high mechanical advantage. The design for the actuator also should permit the valve rapidly to resume its normal operation after the emergency has passed. The valve actuator also must be capable of operating effectively in fluid systems having high line pressures, to respond to move the valve to its emergency position regardless of the location of the valve when the emergency occurs. The actuator in addition must be provided with a reliable control system for regulating the movement of the valve in response to an emergency condition so that the forces and stresses on the valve seat and on the other valve components is minimized.

The valve actuating and control system in accordance with this invention satisfactorily meets the above design parameters. To accomplish this, the system includes a valve member which can be driven between an opened and a closed position. An auxiliary drive means in the form of a compression spring or the like constantly biases the valve toward an emergency position, usually closed. The system of this invention allows this spring or other auxiliary drive force to be of substantial magnitude so that the valve can be quickly driven to its emergency position from any starting position between partly and fully opened, even under high line pressures.

A main driving system also is provided to move the valve member under normal operating conditions. Since this main drive overrides the substantial force of the auxiliary drive it is coupled to the valve member through a force-multiplying system which substantially magnifies the main driving force. In the preferred embodiment the drive force-multiplying is achieved by joining the drive to the valve member with a gear reduction train and a rack and pinion.

Further, the valve actuating system includes an electromagnetic clutch which has mutually engagable clutch faces that are arranged to provide a varying degree of coupling between a rigidly coupled and an uncoupled condition. The clutch joins the main drive means to the valve member, and is energized by a clutch control circuit which normally maintains the clutch in a rigidly coupled condition. A detent or stop means cooperates with the clutch to preclude any back-tracking motion of the main drive, so that the valve member can be selectively retained in the desired position between closed and opened.

In accordance with this invention the clutch control circuit also includes circuitry for sensing an emergency condition and for controlling the response of the valve to that emergency condition. Specifically, the control circuit includes means to electrically oppose and dampen the driving force of the auxiliary valve drive, so that the movement of the valve member is controlled. This control is accomplished by a charging circuit which builds up and stores electrical energy during the normal valve operations at a rate proportional to the build-up of the auxiliary drive force for the valve member. The electrical dampening energy available in the system thereby is proportional to the drive force which must be dampened. A discharge circuit permits the gradual discharge of the stored electrical energy, in response to an emergency signal, into the electromagnetic clutch. The degree of coupling of the clutch is thereby gradually decreased as the stored energy discharges through the clutch. The resulting clutch slippage functions to dampen the motion of the valve member resulting from the force of the auxiliary valve drive.

EXEMPLARY EMBODIMENT

Additional objects and features of the present invention will become more apparent from a description of an embodiment thereof, taken in conjunction with the following drawings, in which:

FIG. 1 is a front elevational view of a valve assembly showing the valve actuator in accordance with this invention in place upon a valve body;

FIG. 2 is a cross-sectional front elevational view of the valve actuator mechanism;

FIG. 3 is a cross-sectional end elevational view of the valve actuator mechanism illustrated in FIG. 2;

FIG. 4 is a schematic illustration of the valve actuating mechanism in accordance with this invention;

FIG. 5 is a schematic diagram of a control circuit for the magnetic clutch incorporated in the valve actuating mechanism;

FIG. 6 is a graph illustrating the delayed clutch voltage decay curve which results when the clutch control circuit illustrated in FIG. 5 receives a signal indicative of an emergency condition;

FIG. 7 is a graph illustrating the gradient build-up of the dampening voltage available to the clutch during the valve opening operation; and FIG. 8 is a removed sectional view illustrating a one-way roller clutch bearing usable with the clutch shaft of the valve actuating mechanism.

Briefly described with reference to FIG. 1, the present invention provides a valve assembly 10 including a safety shut-off valve 20 and a valve actuator mechanism 30. The actuator 30 controls the movement of the safety valve 20 under normal operating conditions so that the valve may be opened and shut by either manual or automatic control apparatus. The actuator 30 also permits the rapid movement of the valve 20 to an emergency position, such as a fully closed position, in response to a signal indicating an emergency. After the emergency condition has passed, the actuator 30 can be re-energized to operate the valve 20 without the need for any separate recocking or resetting procedures.

The valve assembly 10 accordingly is useful in fluid systems having quick acting control devices, such as automatic shut-down equipment and the like. Since the actuator 30 allows the valve 20 to be opened or closed quickly with high mechanical advantage, the valve assembly 10 also can be utilized efficiently in fluid systems having substantially high line pressures.

In accordance with the present invention, the improved actuator 30 incorporates energy storing means, such as a coil spring or the like, for forcefully and rapidly moving the valve 20 to its emergency condition in response to an emergency signal, such as an interruption of electrical power to the actuator 30. To meet the needs of customers, and to satisfy the requirements and standards of industry testing laboratories and agencies, the amount of energy stored in the spring or the like must be sufficient to move the valve 20 to its emergency position within a set time (usually within one second) from any valve position between the fully closed and fully opened positions. In the usual situation, the actuator 30 must respond to an emergency signal by closing the valve 20 forcefully against its valve seat, to provide a safety shut-down of the valve assembly 10.

The amount of stored energy needed to assure such emergency shut-down is substantial, and usually is on the order of several hundred inch pounds. Such a high level of stored energy is especially necessary where the valve 20 is used in a fluid system with high line pressure, and must be quickly closed from a partially opened position. The actuator 30 therefore includes an improved dampening mechanism to control the movement of the valve 20 under emergency conditions, when the substantial stored energy is released, by retarding the valve closing speed and substantially reducing the impact load on the valve seat and the other components of the assembly 10.

Referring to FIGS. 2 and 3 in more detail, the valve 20 to be controlled by the actuator 30 can include any suitable valve closure element. In the illustrated embodiment, the valve 20 includes a sliding plate or guillotine valve 22, as shown schematically in FIGS. 1 and 2. The valve plate 22 includes the usual valve aperture (not shown) which is alignable with a fluid line to permit the flow of fluid through the valve 20. The valve plate 22 is further movable into engagement with a valve seat or other suitable stop means to cut off the flow of fluid through the valve 20. In the illustrated embodiment the valve 20 is closed when the valve plate 22 is in a raised position, as shown in FIG. 2, and is opened when the valve plate 22 is lowered.

The actuator 30 is isolated from the fluid compartment of the valve 20 by a fluid-tight valve bonnet 31a, which is sealed to prevent the fluid flowing through the valve 20 from contaminating the interior of the housing 31. A valve stem 23 extends upwardly from the valve 20 through the valve bonnet 31a into the housing 31 and is connected to the valve plate 22, as illustrated in FIG. 2. The upper end of the valve stem 23 is joined to a brace member 24 which is free to move vertically within the actuator housing 31. If desired, a signal plate 25 can be connected to the brace 24, to provide a visual indication of the position of the valve plate 22.

In the preferred embodiment, the energy storing means for the actuator 30 comprises a compression spring 26 positioned between the housing 31 and the brace 24. The spring 26 constantly forces the brace 24 and the connected valve stem 23 and valve plate 22 upwardly, as viewed in FIGS. 2 and 3, and is compressed when the valve plate 22 is lowered into its opened position. Mating guides 27 and 28 are provided to assure the linear movement of the spring 26 and stem 23 as the spring is compressed.

The valve 20 is thereby biased toward its normally closed position by the energy stored in the compressed spring 26. The characteristics of the spring 26 depend upon the safety and design requirements of a particular valve installation. The preferred design for the spring 26 will force the valve plate 22 closed from any operating position, under high fluid line pressure, within a time span of one second or less. Also, it is preferred that the components of the actuator 30 be arranged to constantly compress the spring 26 and thereby apply a selected preload to the valve plate 22, so that the valve seating is assured.

The valve actuator 30 also includes a drive system for operating the valve stem 23 and the connected valve plate 22 with substantial mechanical advantage. The drive system may comprise a suitable manual crank 29, shown in FIG. 4, for opening and closing the valve 22 against the force of the spring 26. In the embodiment illustrated in FIGS. 2 and 3, the actuator 30 incorporates a motorized drive system which is energized by a unidirectional AC motor 40 operating through a drive shaft 41. A first pair of spur gears 42a and 42b joins the motor drive shaft 41 to a clutch shaft 43. The clutch shaft 43 is mounted for rotation on the actuator housing 31 by a set of bearings 44a and 44b.

Braking means are provided to prevent any substantial reverse rotation of the clutch shaft 43, so that the drive system will releasably retain the valve plate 22 in any selected position between the fully closed and fully opened positions during the normal operation of the actuator 30. In the illustrated embodiment, the clutch shaft 43 is braked by arranging the shaft bearing 44a as a one-way clutch roller bearing which permits the shaft 43 to rotate in one direction, but which prevents any reverse rotation. A suitable design for the clutch roller bearing 44a is illustrated in FIG. 8 and is available currently from the Torrington Company of Torrington, Connecticut as a series RCB drawn cup roller clutch.

As seen in FIG. 8, the rollers 'r' of the bearing 44a engage the periphery of the clutch shaft 43 and are retained in wedge-shaped recesses in an outer race 'o'. The rollers 'r' have clearance in the recesses in the race 'o'. to allow the shaft 43 to be driven counterclockwise during the operation of the actuator 30. Reverse or clockwise rotation of the shaft 43 in the bearing 44a is prevented by the wedging of the rollers 'r' against the recesses in the outer race 'o'.

The actuator 30 also includes a driven shaft 45 which is supported on the valve actuator housing 31 by a set of bearings 46a and 46b. As seen in FIGS. 2 and 4, the shaft 45 carries a pinion gear 47. A toothed rack 48 meshes with the pinion 47 to convert the rotary motion of the driven shaft 45 and the pinion 47 into linear motion of the rack. The rack 48 is slidably mounted on a guide stem 49, and is connected to the brace 24 so that the linear motion of the rack along the guide stem 49 is transmitted to the brace 24 and thereby to the coil spring 26. Due to this arranement, the brace 24 operates to compress the spring 26 when the pinion 47 rotates clockwise to drive the engaged rack 48 downwardly, as viewed in FIGS. 2 and 4.

A gear reduction train formed from a second set of spur gears 50a and 50b is provided in the actuator 30 to drive the shaft 45 and pinion 47. The smaller pinion 50a is mounted freely on the clutch shaft 43, and the larger gear 50b is fixed to the driven shaft 45 by a suitable set screw or the like. The gears 50a and 50b are selected to provide the desired speed reduction ratio, which is preferably in the range of a 4 to 1 reduction. During the operation of the actuator 30, the pinion 50a is coupled to the clutch shaft 43 and the motor 40 by a clutch system 60 so that the motor 40 drives the shaft 45 at a selected speed. The gear reduction train created by the operation of the pinion 50a and gear 50b provides a substantial mechanical advantage, so that the motor 40 easily can open the valve 20 by compressing the spring 26. The gear reduction train thereby permits the size and expense of the motor 40 and other components of the actuator to be minimized, while allowing for the use of a spring 26 which is large enough to create the desired substantial valve closing force.

The effective rate for opening the valve plate 22 by the actuator 30 is a function of the speed of the motor 40; the gear reduction ratio of the gear train formed from gears 50a and 50b; the gear ratio between the spur gears 42a and 42b; and the ratio of the rack 48 and pinion 47. The motor 40 may be a reversing motor which will forcefully drive the valve element 22 open or closed. However, because of the availability of the substantial closure force provided by the compression spring 26, the motor 40 preferably is a uni-directional drive motor which operates to drive the valve plate 22 downwardly, as viewed in FIGS. 2 and 3, to compress the spring 26 and move the valve 20 into its open position. The one-way roller clutch 44a supporting the clutch shaft 43, or other suitable stop means, will cause the motor 40 to hold the valve plate 22 in its preset open position, as long as the clutch system 60 is activated to couple the clutch shaft 43 and motor 40 to the gear train 50a, 50b and the driven shaft 45. The closing force of the compression spring 26 will operate to forcefully close the valve plate 22 when the motor 40 is disconnected from the driven shaft 45 by the de-activation of the clutch system 60.

As illustrated in FIG. 2, the actuator 30 may also include a set of limit switches 32 and 33 for controlling the operation of the motor 40. The switches 32, 33 are rigidly secured to the actuator housing 31, in a position for engagement with control pins 34 and 35 provided on the sliding rack 48. The limit switches 32 and 33 are joined into a suitable motor control circuit (not shown) which controls the operation of the motor 40 between the limits defined by the positions of the switches and pins. Thus, the engagement between the control pin 35 and lower limit switch 33 can be arranged to de-energize the motor when valve plate 22 reaches its fully opened position, and the engagement between the pin 34 and the upper limit switch 32 can be arranged to permit the motor 40 to operate after the valve plate 22 has reached its closed position.

In accordance with this invention the clutch system 60 comprises an electromagnetic clutch positioned on the clutch shaft 43. As illustrated in FIGS. 3 and 4, the clutch 60 includes an annular field coil 61 which is maintained in a stationary position within the housing 31 by means of a locking pin 62. An annular rotor 63 is surrounded by the field coil 61, and is joined for rotation to the clutch shaft 43 by suitable splines or keys. The rotor 63 will thereby rotate within the field coil 61 when the clutch shaft 43 is rotated by the operation of the motor 40. An annular friction surface on the outer portion of the rotor 63 defines a clutch face 64 which rotates with the rotor.

The clutch system 60 also includes an armature 65 freely supported for rotation on the clutch shaft 43. One end of the armature member 65 defines a frictional clutch face 66 which is positioned in axial alignment adjacent the clutch face 64 on the rotor 63. As illustrated in FIG. 3, the other end of the armature 65 is joined to the pinion 50a. At least a portion of the adjacent surfaces of clutch faces 64 and 66 is made from feromagnetic material so that the faces will be frictionally joined together by magnetic attraction during the operation of the clutch 60, when the field coil 61 is energized. The clutch 60 will thereby induce the armature 65 and the connected pinion 50a to rotate in unison with the clutch shaft 43 when the clutch is energized.

In accordance with this invention, the clutch system 60 performs three functions during the operation of the actuator 30. First, the clutch 60 operates to couple the motor 40 to gear train 50a, 50b and the rack and pinion 47 and 48 during the valve opening operation. Secondly, the clutch 60 functions as a braking mechanism, to couple the driven shaft 45 with the clutch shaft 43 so that the one-way roller bearing 44a will hold the valve plate 22 in a fixed position by braking against any back-tracking or reverse motion of the actuator as a result of the force of the compression spring 26. Thirdly, the clutch 60 in accordance with this invention operates as an electric dampening mechanism which selectively retards the speed of the valve closing movement. The clutch 60 thereby reduces the impact forces on the valve components induced by the release of the energy stored in the compression spring 26 when an emergency condition occurs.

FIG. 5 illustrates a control circuit 70 for energizing the clutch system 60 as the clutch performs the multiple functions of coupling, braking and dampening. The circuit 70 includes input terminals 71 and 72 for connection to a suitable source 'S' of electrical power. The circuit 70 also includes output terminals 73 and 74 for connection to the magnetic clutch circuit M of the clutch system 60. In the illustrated embodiment the output terminals 73 and 74 are connected to the leads of the magnetic field coil 61 so that the circuit 70 controls the voltage across the coil.

The power source 'S' can be either a direct current or an alternating current source of sufficient power to supply the rated voltage to the clutch 60 across the output terminals 73 and 74. When the source 'S' is an AC source, as illustrated in FIG. 5, the circuit 70 includes a suitable full wave rectifier and filter circuit F for converting the AC input into the desired direct current signal for the clutch 60. If the source S is a DC source, the circuit 70 can be modified easily by those skilled in the art to include the necessary components to produce the desired constant direct current signal across the terminals 73 and 74. If needed, conventional voltage regulation circuitry can be added to the filter circuit 'F' to maintain a constant voltage across the output terminals 73, 74, under normal conditions, regardless of variations in line voltage in the source 'S'.

As shown schematically in FIG. 5, the control circuit 70 also incorporates an emergency sensing circuit 'E' interposed between the source 'S' and the filter circuit F. The circuit 'E' is usually remote from the valve and includes conventional sensing and switching gear which creates an emergency signal in the circuit 70, such as a complete break in the circuit, in response to the sensing of an emergency condition. Typical emergency conditions which the circuit E can be programmed to sense are a power loss or a fire danger in the fluid system in which the valve 20 is employed.

The circuit 70 is provided with leads 75 and 76 which electrically connect the output terminals 73, 74 to the source 'S', through the emergency and filtering circuits 'E' and 'F'. The circuit 70 thereby provides a constant voltage at the terminals 73, 74 and supplies that power signal to the clutch control circuit M, under normal operating conditions for the valve assembly 10. The voltage-time graph comprising FIG. 7 schematically illustrates the constant application of voltage across the terminals 73, 74 and the clutch 60 under normal operating conditions, when the rated voltage for the clutch 60 is 90 volts.

The circuit 70 also includes an energy-storing means in the form of a capacitor C connected across the leads 75 and 76. The capacitor C in accordance with this invention is charged at a predetermined rate by the energization of the circuit 70. As shown by the curve 'C' in FIG. 7, the charging rate for the capacitor C is selected so that the energy build-up in the capacitor occurs as an exponential or other selected gradiant function of time. As seen in FIG. 7, the size of the capacitor C is selected so that at full charge the energy level approaches the level of the power signal (e.g., 90 volts) constantly applied to the terminals 73, 74 under normal operating conditions. In one example of the circuit 70, the capacitor C is 100 microfarads.

The charging circuit for producing the controlled rate of charge in the capacitor C is formed from a pair of resistors $R_1$, $R_2$ shunted across the power leads 75,76. $R_1$ is selected to present a high resistance in the charging circuit so that the capacitor C is gradually charged as the current flows through the leads 75, 76 during normal operation of the valve actuating mechanism 30. In the illustrated embodiment where the rated voltage of the clutch 60 is 90 volts and the capacitor C is 100 microfarads, a suitable $R_1$ is selected to be 33,000 ohms. A suitable charging curve for the capacitor C is shown in FIG. 7 of the drawings.

In the illustrated embodiment the resistor $R_2$ is smaller than $R_1$ and is also incorporated in a discharge circuit with a suitable diode D. $R_2$ is sized with respect to the size of the clutch 60, and in the illustrated embodiment is 2,200 ohms. The diode D is connected between the output terminal 73 and a terminal 77 between $R_1$ and $R_2$. The reverse bias of the diode D prevents current flow from the charged capacitor C to the clutch 60, through the diode D, during normal operation, when a voltage is applied across the output terminals 73, 74. The biasing of diode D occurs because under such normal conditions the terminal 73 is at a higher voltage than the terminal 77 so that current will not flow through the diode D from terminal 77 to terminal 73. Diode D also blocks current flow from terminal 73 to to terminal 77 which would shunt $R_1$ and prematurely charge C through $R_2$.

When an emergency condition occurs, the sensing circuit E is adapted to respond by cutting the power from the source S. Under those emergency conditions the voltage drop across output terminals 73, 74 and the bias of the diode D are eliminated. The charged capacitor C then discharges through the path of least resistance defined by the discharge circuit comprising the resistor $R_2$ and the diode D. The relatively high resistance value of the resistor $R_1$ prevents any substantial back-flow of current into the filter circuit F as the capacitor C discharges. The capacitor C therefore discharges through the resistor $R_2$ and the diode D into the clutch control circuit 'M' when an emergency condition occurs. The circuit 'M' in turn feeds the charge to the field coil 61 of the clutch 60 so that the voltage across the clutch and the resultant magnetic field gradually decay over a selected period of time.

A suitable exponential decay curve for the voltage decay across the clutch 60 is shown in FIG. 6. Since many industrial standards require an emergency shut-down within a one second interval, the decay curve illustrated in FIG. 6 approaches zero clutch voltage within a time of one second. It will be appreciated by those skilled in the art that these voltage-time characteristics for the circuit 70 can be selected to suit the particular field installation.

In accordance with this invention, the decaying voltage across the clutch 60 as a result of an emergency condition directly effects the degree of coupling between the two mating clutch faces 64 and 66 of the clutch 60. As shown in FIG. 6, a gradual decrease in the degree of clutch coupling results as the clutch voltage decays upon discharge of the capacitor C. As the degree of the clutch coupling decreases, the biasing force of the valve spring 26 tends to rotate the clutch face 66 with respect to the face 64, and thereby move the valve 20 toward a selected, usually closed position. The spring 26 thereby functions as an auxiliary drive for the valve 20 which is normally over-ridden by the main drive comprising the motor 40 coupled to the valve 20 through the clutch 60. Further, under emergency conditions the auxiliary drive force of the spring 26 is controlled or dampened by the decaying voltage across the clutch 60 resulting from discharge of the capacitor C.

Thus, as shown in FIG. 6, during the initial portion of the discharge cycle for the capacitor C the clutch voltage is sufficient to cause the clutch to remain rigidly coupled, so that there is little or no movement of the valve 20 as a result of the driving force of the spring 26. The continued decay of the voltage across the clutch 60 causes the clutch 60 to slip by gradually decreasing the degree of clutch coupling. The valve 20 is then gradually moved by the driving force of the spring 26, until the valve returns to its emergency condition, usually closed.

To begin the operation of the valve actuator 30 under normal conditions, the source S is energized to apply power to the motor 40 and the clutch 60. This power application to the motor 40 and clutch 60 is maintained as long as no emergency condition is sensed by the sensing circuit 'E'. Under those normal conditions, the filter circuit F applies the rated voltage, such as 90 volts, across the clutch 60 through the leads 75, 76, the terminals 73, 74 and the clutch control circuit 'M'. The power circuit 70 thereby operates to fully energize the field coil 61 of the clutch 60 and hold the clutch faces 64 and 66 in their maximum rigidly coupled condition.

When the clutch 60 is so coupled, the valve plate 22 can be moved to an opened position, against the biasing force of the spring 26, by operation of the motor 40. The spur gears 42a and 42b transmit the torque of the motor shaft 41 to the clutch shaft 43. The rigidly coupled clutch 60 in turn transmits the motor torque to the pinion 50a, and the gear reduction train formed by the pinion 50a and gear 50b operates as a force-multiplier to increase the motor torque force applied to the pinion 47. The pinion 47 transmits the torque force to the rack 48 so that the rack is forced downwardly in FIGS. 2 and 3. As a result, the main valve drive system including the motor 40 will operate with substantial mechanical advantage to compress the valve drive spring 26, and thereby drive the valve plate 22 into its opened position. The driving force of the motor 40 will cease when the limit switch 33 is engaged by the control pin 35. The drive spring 26 constantly urges the valve plate 22 downward toward its closed position. However, as long as the clutch 60 is rigidly coupled, the one-way roller bearing 44a prevents any back-tracing of the main valve drive train and thereby maintains the valve plate 22 in its opened position. Under these normal conditions the valve 20 can be closed by selectively decoupling the clutch 60 by a suitable interrupter circuit (not shown) which cuts off the power to the clutch control circuit M. Of course, the one-way bearing 44a can be replaced by other suitable detent means, and the uni-directional motor 40 can be replaced by a two-directional motor that will drive the valve 20 opened and closed during normal conditions, without departing from this invention.

The operation of the valve system 10 under the normal conditions described above also causes the circuit 70 to operate to charge the capacitor C by directing current through the charging circuit defined by the resistors $R_1$ and $R_2$. A suitable gradual charging rate for the capacitor C is illustrated in FIG. 7. The circuit 70 thereby produces a braking or dampening voltage in the capacitor C which is available to the clutch 60 as soon as the circuit 70 is energized to start the valve opening operation. This available dampening voltage increases as the degree of opening of the valve plate 22 and the degree of compression of the valve drive spring 26 increase. The charging of the capacitor C is therefore directly related to the position of the valve plate 22 so that the dampening force available to the clutch 60 from the capacitor charge is directly proportional to the valve closing energy stored in the compressed drive spring 26.

When an emergency condition occurs in the fluid system incorporating the valve 10, the sensing circuit E breaks the circuit 70 so that current ceases to flow from the source S to the output terminals 73, 74. The constant voltage energizing the clutch circuit M and the clutch 60 also ceases. The energy stored in the capacitor C discharges through the discharge circuit $R_2$ and D and thereby applies a dampening voltage to the clutch C for a selected time interval. The circuit 70 and the electromagnetic clutch 60 therefore retard and dampen the substantial valve closing force applied by the compressed drive spring 26. The valve plate 22 is driven by the spring 26 into a closed position, where it will remain during the emergency conditions.

After the emergency condition has passed, the sensing circuit E re-establishes the continuity of the circuit 70, and the clutch 60 is thereby re-energized. Operation of the motor 40 will then function to re-open the valve 20 by moving the valve plate 22 against the biasing force of the drive spring 26.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A control system for regulating in a predetermined fashion the driving force applied to a driven valve member, comprising:

driven means including said driven valve member moveable between first and second spaced positions;

drive means for developing a driving force to move said driven means toward at least one of said first and second positions, said drive means being constructed and arranged such that the magnitude of said driving force varies in effective relation to the distance of said driven member from said one position;

clutch means comprising a pair of rotatable and mutually engagable clutch members arranged with one of said clutch members jointed to said driven means;

an electrical clutch control circuit for regulating, in accordance with the magnitude of an electrical signal applied to said control circuit, the degree of coupling of said pair of clutch members between a minimum decoupled condition where the clutch members rotate independently to a maximum rigidly coupled condition where said members rotate in unison; and clutch control means including an electrical signal circuit for developing and applying an electrical signal to said control circuit of said clutch means which signal is effectively related in magnitude to said driving force developed by said drive means for effecting a predetermined force-position characteristic in movement of said driven means toward said one position.

2. A control system in accordance with claim 1 wherein said drive means comprises an auxiliary drive operable to restore said driven means to said one position and wherein said system includes further main drive means normally overriding said auxiliary drive and operatively connected to the other clutch member to move said driven means toward the other of said first and second positions.

3. A control system in accordance with claim 2 wherein said auxiliary drive urges said driven valve member to said one position with a substantial force, and further wherein said main drive means includes a force-multiplying system that permits said main drive means to override said auxiliary drive with substantial mechanical advantage, and detent means releasably retaining said driven means in a selected position between said first and second positions against the force of said auxiliary drive means.

4. A control system in accordance with claim 3 wherein said force-multiplying system comprises a gear reduction train coupling said main drive and driven means and arranged to multiply the force transmitted from said drive to said driven means.

5. A control system in accordance with claim 2 wherein said auxiliary drive comprises spring means arranged to produce a biasing force urging said driven valve member toward said one position which force varies in magnitude directly with the distance of said valve member from said one position.

6. The control system of claim 2 in which said signal circuit comprises a capacitor and a charging circuit therefor for fully charging said capacitor at a rate related to the movement of said driven means from said one position to the other position and wherein said signal circuit further includes a discharge circuit for discharging said capacitor through said clutch control circuit to effect a gradual braking disengagement of said driven means from said main drive means permitting said auxiliary drive means to gradually return said driven means to said one position.

7. The control system of claim 1 in which said drive means is arranged such that the magnitude of the force developed to move said driven means toward said one position increases upon increase of the distance of said driven means from said one position, and further wherein said signal circuit applies a signal to said clutch control circuit which increases the degree of coupling between said clutch members as the magnitude of the force developed by said drive means increases, whereby said clutch dampens the force developed by said drive means in proportion to the distance of said driven means from said one position.

8. The control system of claim 1 in which said clutch control means include a power circuit normally bypassing said signal circuit for applying an electrical signal to said control circuit of said clutch means of a magnitude to maintain said clutch members in a rigidly coupled condition and further including sensing means responsive to a sensed condition for disconnecting said power circuit from said control circuit to permit effective operation of said signal circuit.

9. An emergency valve actuating mechanism for moving a valve member between an opened and closed position comprising:

main valve drive means for moving said valve member between said opened and closed positions at a predetermined rate;

auxiliary valve drive means normally overridden by said main drive means and biasing said valve member toward one of said positions such that the magnitude of the biasing force increases as the valve member moves from said one position;

clutch means comprising a pair of rotatable and mutually engagable clutch members arranged with one of said clutch members joined to said main drive means and the other clutch members operably joined to said valve member;

an electrical clutch control circuit for regulating, in accordance with the magnitude of an applied electrical signal, the degree of coupling of said pair of clutch members between a minimum decoupled condition where the clutch members rotate independently to a maximum rigidly coupled condition where said members rotate in unison;

clutch control means comprising a power circuit for applying an electrical signal to said clutch control circuit of a magnitude to maintain said clutch members rigidly coupled and a signal storage circuit coupled to said power circuit through a charging circuit for applying electrical signal energy to said signal storage circuit at a gradual rate up to a maximum stored energy level approaching in magnitude to the signal from said power circuit; and emergency sensing means for effectively de-energizing said power circuit of said clutch control means and for effectively coupling said signal storage circuit to said clutch control circuit to apply said stored electrical energy to said clutch through a discharge control circuit to provide a gradual decoupling of said main drive means and said valve member for permitting a gradual dampened return of said valve member to said one position under the influence of said auxiliary drive means.

* * * * *